United States Patent [19]
Anderson et al.

[11] Patent Number: 5,527,628
[45] Date of Patent: Jun. 18, 1996

[54] PB-FREE SN-AG-CU TERNARY EUTECTIC SOLDER

[75] Inventors: Iver E. Anderson, Ames, Iowa; Frederick G. Yost, Cedar Crest, N.M.; John F. Smith, Ames, Iowa; Chad M. Miller, Ames, Iowa; Robert L. Terpstra, Ames, Iowa

[73] Assignees: Iowa State University Research Foudation, Inc., Ames, Iowa; Sandia Corporation, Albuquerque, N.M.

[21] Appl. No.: 394,228

[22] Filed: Feb. 24, 1995

Related U.S. Application Data

[63] Continuation of Ser. No. 94,854, Jul. 20, 1993, abandoned.

[51] Int. Cl.[6] ................................................. B23K 35/26
[52] U.S. Cl. .................. 428/647; 420/560; 228/262.9
[58] Field of Search ............................ 420/558, 560, 420/561; 228/233.2, 262.9; 428/646, 647

[56] References Cited

U.S. PATENT DOCUMENTS

| | | | |
|---|---|---|---|
| 989,573 | 4/1911 | Daudelin | 420/558 |
| 1,437,641 | 12/1922 | Ferriére et al. | 420/560 |
| 4,248,905 | 2/1981 | Harvey | 427/11 |
| 4,643,875 | 2/1987 | Mizuhara | 420/560 |
| 4,670,217 | 6/1987 | Henson et al. | 420/562 |
| 4,695,428 | 9/1987 | Ballentine et al. | 420/561 |
| 4,758,407 | 7/1988 | Ballentine et al. | 420/560 |
| 4,778,733 | 10/1988 | Lubrano et al. | 428/647 |
| 4,879,096 | 11/1989 | Naton | 420/561 |
| 5,352,407 | 10/1994 | Seelig et al. | 420/560 |

FOREIGN PATENT DOCUMENTS

| | | | |
|---|---|---|---|
| 42-18219 | 9/1967 | Japan | 420/558 |
| 52-6468 | 1/1977 | Japan | 420/560 |

OTHER PUBLICATIONS

"Über den Aufbau des systems Silber–Kupfer–Zinn" Z. *Metallkunde Bd.* 50 (1959) H.10, p. 597.

"Developing Lead–Free Solders: A Challenge and Opportunity"; *JOM*, vol. 45, No. 7, Jul. 1993, pp. 1 and 13; Sungho Jin.

*Primary Examiner*—Mark Rosenbaum
*Assistant Examiner*—Jeffrey T. Knapp
*Attorney, Agent, or Firm*—Edward J. Timmer

[57] ABSTRACT

A Pb-free solder includes a ternary eutectic composition consisting essentially of about 93.6 weight % Sn-about 4.7 weight % Ag-about 1.7 weight % Cu having a eutectic melting temperature of about 217° C. and variants of the ternary composition wherein the relative concentrations of Sn, Ag, and Cu deviate from the ternary eutectic composition to provide a controlled melting temperature range (liquid-solid "mushy" zone) relative to the eutectic melting temperature (e.g. up to 15° C. above the eutectic melting temperature).

20 Claims, 3 Drawing Sheets

PB-FREE SN-AG-CU TERNARY EUTECTIC SOLDER

The United States Government has rights in this invention pursuant to Contract No. W-7405-ENG-82 between the U.S. Department of Energy and Iowa State University, Ames, Iowa, which contract grants to Iowa State University Research Foundation, Inc. the right to apply for this patent.

This application is a continuation of U.S. Ser. No. 08/094,854, filed Jul. 20, 1993, now abandoned.

FIELD OF THE INVENTION

The present invention relates to Pb-free solders and, more particularly, to a relatively ductile, low cost, high strength solder based on a Sn-Ag-Cu ternary eutectic composition having a melting point of about 217° C.

BACKGROUND OF THE INVENTION

Lead metal (Pb) and its compounds are well known toxins. Despite this, lead is a component of solder alloys in widespread use in the electronic industry. For example, a binary eutectic Sn-Pb (e.g. 63 weight % Sn-37 weight % Pb—melting point of 183° C.) solder and Pb-5 weight % Sn solder are in widespread use for electronic and circuit joining applications. However, in the United States, there is proposed Congressional legislation to ban, or possibly heavily tax, the use of lead in all commercial products, such as, for example, electronic solders.

In response to the possibility of a governmental ban or excessive taxation of lead use, manufacturers and users of Pb-bearing solder for electronic and circuit joining applications recently have attempted to developed Pb-free solders especially as direct replacements for the conventional Sn-Pb solders in conventional solder reflow procedures employing general heating of an electronic wiring board to temperatures of 230° to 250° C.

In particular, binary eutectic Sn-Ag, Sn-Sb and Sn-Bi solders have been developed as Pb-free solders. For example, a 96.5 weight % Sn-3.5 weight % Ag solder, 95 weight % Sn-5 weight % Sb and 43 weight % Sn-57 weight % Bi solder have been developed. These Pb-free solders exhibit eutectic melting points of 221° C., 245° C. and 139° C., respectively. These solders are described by Sungho Jin in a series of articles in *Journal of Metals*, July, 1993; namely, "Developing Lead-Free Solders: A Challenge and Opportunity," *JOM*, 45, no. 7, page 13, (1993). The Sn-Ag solder melting point is described as "slightly too high", while the Sn-Sb solder is described as having a "melting point too high". The Sn-Bi solder melts at a low temperature but suffers from rapid microstructural coarsening, poor wetting, and poor creep resistance.

Other Pb-free binary eutectic solders comprising Sn-In and Sn-An have been developed. However, these binary solders are disadvantageous in that both are brittle and include relatively large amounts; e.g. 50.9 weight % of In or 80 weight % of Au that are costly alloy components and not as readily available as previously used alloy components. Also, the Sn-Au solder has an elevated eutectic temperature of 278° C. that is too high for conventional solder reflow temperatures.

The aforementioned Pb-free binary solders have been used as replacements for the conventional Sn-Pb solders in some solder fellow procedures employing general heating of an electronic wiring board to non-standard temperatures.

A ternary, off-eutectic Sn-Cu-Ag solder has been developed by the plumbing industry as a Pb-free solder with, for example, 96 weight % Sn-3.5 weight % Cu-0.5 weight % Ag. This plumbing solder has a 227° C. solidus temperature and 260° C. liquidus temperature which would be considered too high by electronics manufacturers. Moreover, this solder exhibits a "mushy" solid-liquid zone of 33° C. that is too great for electronic soldering.

As microelectronic technology continues to evolve, microprocessors are becoming more complex and in all likelihood will generate more heat and increase thermal strains in electronic and circuit solder joints. Moreover, the service environment of electronic solder joints in all probability will become more severe. For example, electronic packages are now required to be positioned closer to the engine in automobiles for faster response and greater cost effectiveness. To produce automobiles with increased fuel efficiency, lower hoods and smaller front mounted air inlets are provided to streamline the automobile body. These changes subject automotive electronics packages in the engine compartment to higher operating temperatures and higher thermal strains. In emerging avionics applications, electronic packages used for sensing, control, and telemetry are exposed to severe ambient temperature cycles that create cyclic thermal strains at solder joints of the electronic packages used.

As a result of the more severe service demands being imposed on electronic packages in the automotive, avionics and other fields, there is a need for a solder that not only is Pb-free and amenable to the aforementioned conventional solder fellow procedures but also is stronger and more fatigue resistant than the Pb-free binary alloy solders (e.g. Sn-Bi and Sn-In) discussed hereabove. Moreover, there is a need for such a solder that would be competitive in cost and as readily available as conventional Sn-Pb eutectic solders for high volume use.

SUMMARY OF THE INVENTION

The present invention provides a Pb-free solder that satisfies these needs. In particular, the present invention provides a Pb-free solder comprising a heretofore unknown ternary eutectic composition consisting essentially of about 93.6 weight % Sn-about 4.7 weight % Ag-about 1.7 weight % Cu having a eutectic melting temperature of about 217° C. and variants of the ternary eutectic composition. In the variants of the ternary eutectic composition in accordance with the invention, the relative concentrations of Sn, Ag, and Cu deviate from the ternary eutectic composition to provide a controlled melting temperature range (liquid-solid "mushy" zone) relative to the eutectic melting temperature while providing an advantageous microstructure including beta Sn phase and at least two different intermetallic compounds distributed in the beta Su phase, one compound including Cu and Sn and another compound including Ag and Sn. Preferably, the solder components are adjusted relative to one another to provide a melting temperature range that extends no more than 15° C. above the ternary eutectic melting temperature.

In one embodiment of the invention, the Pb-free solder consists essentially of about 3.5 to about 7.7 weight % Ag, about 1.0 to about 4.0 weight % Cu and the balance essentially Sn.

In another embodiment of the invention, the solder may include an alloy component in an amount effective to improve wettability and/or to lower the solder melting temperature range (liquid-solid "mushy" zone) as necessary for a particular solder application. Preferably, the solder includes Bi in an amount up about 10 weight % to this end.

In another embodiment of the invention, the solder may include at least one alloy component selected from the group consisting essentially of Si, Sb, Zn, Mg, Ca, a rare earth element, and misch metal in a collective amount not exceeding about 1 weight %, for example, to improve wettability, enhance fatigue strength, and/or refine solder joint grain size.

In still another embodiment of the invention, the solder optionally may include Pb in an amount not exceeding about 10 weight % for improved wettability and ductility. This embodiment of the invention is optional in the event legislation only taxes Pb use in products rather than bans its use altogether.

The present invention also provides a solder joint comprising a solder of the invention described hereabove wherein the solder joint has a solidified ternary eutectic microstructure comprising beta Sn matrix phase and at least two different intermetallic compounds, one compound including Cu and Sn (e.g. Cu-rich $Cu_5Sn_6$) and another including Ag and Sn (e.g. Ag-rich $Ag_3Sn$), distributed uniformly throughout the beta Sn phase. Such a microstructure improves solder joint strength and fatigue resistance as compared to the beta-Sn and soft alpha-Pb phases that characterize the solidified eutectic microstructure of conventional Sn-Pb solders. Moreover, the microstructural and thermal stability of the solder joint microstructure of the invention is improved by the presence of the aforementioned hard intermetallic compounds.

The solder of the invention described hereabove can be used as a replacement for Pb-containing solder in solder reflow and other soldering processes in widespread use in the electronic and other industries.

The solder of the invention is advantageous not only from an environmental standpoint (its Pb-free composition) but also from a cost and availability standpoint in that the alloy components (Sn, Ag, and Cu) are readily available at lower cost than the Pb-free solders including large amounts of Bi, In, or Ga proposed to-date. Large volume solder applications especially will benefit from the low cost, high performance solder of the invention having the aforementioned advantages not possessed heretofore by other Pb-free solders.

The aforementioned objects and advantages of the invention will become more readily apparent from the following detailed description taken with the following drawings.

DETAILED DESCRIPTION

The Pb-free solder of the present invention is based on a ternary eutectic composition consisting essentially of about 93.6 weight % Sn-about 4.7 weight % Ag-about 1.7 weight % Cu. This ternary eutectic solder composition has been determined by differential thermal analysis (DTA) to have a ternary eutectic melting temperature of about 217° C.; e.g., see FIG. 1 where normalized delta T versus temperature is determined by DTA for the ternary eutectic composition. The DTA ternary eutectic composition sample was prepared by melting elemental components (i.e. elemental Sn, Ag, and Cu rods) in a glass capsule under a He atmosphere. The ternary sample was then solidified by quenching the capsule in a water bath.

Figure 1:
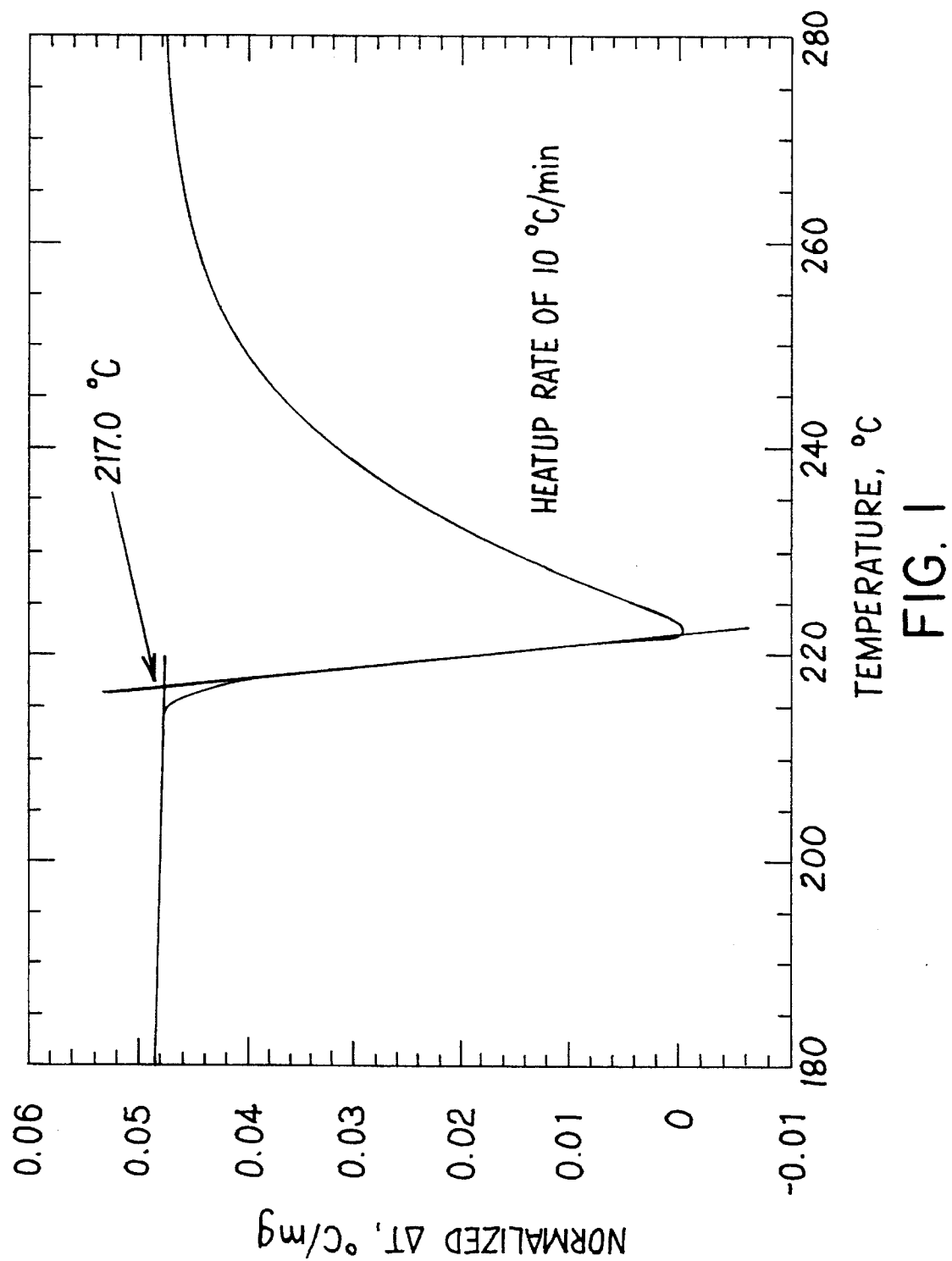
FIG. 1 is a differential thermal analysis of the 93.6 weight % Sn-4.7 weight % Ag-1.7 weight % Cu ternary eutectic solder in accordance with one embodiment of the invention obtained using a heat-up rate of 10° C. per minute.

FIG. 1 indicates a melting temperature of about 217° C. for the ternary eutectic solder of the invention. This melting temperature of 217° C. is lower than either of the adjacent binary eutectic melting temperatures; e.g. melting temperature=221° C. for 96.5 weight % Sn- 3.5 weight % Ag and melting temperature=227° C. for 99.1 weight % Sn-0.9 weight % Cu.

The measured melting temperature of 217° C. for the previously unknown ternary eutectic solder of the invention is contrary to a minimum melting point of 225° C. published heretofore for the Sn-Ag-Cu alloy system by E. Gebhardt and G. Petzon, Z. Metallkde., 50, no. 10, page 597, (1959).

Applicants' measured ternary eutectic melting temperature of about 217° C. was determined and verified by four (4) DTA analyses and with parallel analyses by other techniques, such as differential scanning calorimetry. The difference between Applicants' measured ternary eutectic melting temperature and that published in the aforementioned article is that the previous published report is based on one measurement at a ternary composition (90 weight % Sn-5 weight % Ag-5 weight % Cu) well removed from the eutectic composition discovered by Applicants.

The Pb-free solder of the invention comprises the aforementioned ternary eutectic composition (i.e. about 93.6 weight % Sn-about 4.7 weight % Ag-about 1.7 weight % Cu) which is usable as a Pb-free solder. In addition, the Pb-free solder of the invention also includes variants of the ternary eutectic composition wherein the relative concentrations of Sn, Ag, and Cu are varied relative to the ternary eutectic composition. The Sn, Ag and Cu contents can be varied to provide a controlled, selected melting temperature range above the ternary eutectic melting temperature (217° C.) for a particular solder application. Variation of the relative concentrations of Sn, Ag, and Cu produces a higher melting temperature since the ternary eutectic composition exhibits the lowest melting temperature possible in the ternary system. However, variation of the relative Sn, Ag and Cu contents is controlled to provide at least two different intermetallic compounds in a beta Sn phase matrix upon solidification of the solder wherein one intermetallic compound includes Cu and Sn and another includes Ag and Sn.

Preferably, for electronic solder applications using the solder reflow procedure, the melting temperature range (liquid-solid "mushy" zone) of the solder of the invention is extended no more than 15° C. above the ternary eutectic melting temperature. In particular, such solder reflow procedures involve general heating of a wiring board to temperatures of about 230° to 250° C.). Solders used in such a solder reflow procedure desirably exhibit a limited melting range (i.e. a liquid-solid "mushy" zone) less than about 15° C.

However, the melting temperature range may be different for other solder applications and can be adjusted accordingly pursuant to the invention by variation of the relative concentrations of Sn, Ag, and Cu of the solder of the invention based on the ternary eutectic composition. As a result, the Pb-free solder of the invention can be adapted for use with other solder procedures including procedures using localized heating, such as laser melting or infrared soldering, currently being developed.

A preferred Pb-free solder of the invention consists essentially of about 3.5 to about 7.7 weight % Ag, about 1.0 to about 4.0 weight % Cu and the balance essentially Sn to this end. Representative Pb-free solders of the invention are listed below, the second and third listed alloys exhibiting slightly off-eutectic melting temperatures:

93.6 w/o Sn-4.7 w/o Ag-1.7 w/o Cu (eutectic)

94.9 w/o Sn-3.6 w/o Ag-1.5 w/o Cu 95.0 w/o Sn-4.1 w/o Ag-0.9 w/o Cu

If a lower, enlarged solder melting temperature range is desired for a particular solder application, the invention includes the addition of one or more alloy components in the solder of the invention in an amount effective to that end. For example, the solder of the invention may include Bi in an amount not exceeding about 10 weight % to this end. In particular, a solder of the invention consisting essentially of 88.9 weight Sn-4.5 weight % Ag-1.6 weight % Cu-5 weight % Bi exhibits a limited melting temperature range (solid-liquid "mushy" zone) of about 193° to about 218° C.

Moreover, the invention envisions including in the Pb-free solder of the invention at least one alloy component selected from the group consisting essentially of Si, Sb, Zn, Mg, Ca, a rare earth element, and misch metal in a collective amount not exceeding about 1.0 weight %, for example, to improve wettability, enhance fatigue strength, and/or refine solder joint grain size. The solder of the invention includes no intentional nickel addition. Ni is avoided in the solder of the invention as a result of its formation with Sn of a higher melting temperature phase. The solder of the invention is thus nickel-free.

The solder of the invention optionally may include Pb in an amount not exceeding about 10 weight % for improved wettability and ductility. This embodiment of the invention is optional in the event proposed Congressional legislation ultimately only taxes lead use in products and does not ban it completely.

The solder of the invention can be provided in many forms as needed for particular solder applications. For example, the solder of the invention can be provided as solder wire, solder sheet, solder ingot, and solder powder. The solder wire and sheet forms can be manufactured by conventional solder manufacturing techniques. In these techniques, the solder alloy of the invention initially can be melted by resistance heating under ambient air atmosphere. The solder melt can be chill cast into suitable iron or steel chill molds to produce ingots having high purity and compositional accuracy.

Figure 2A:
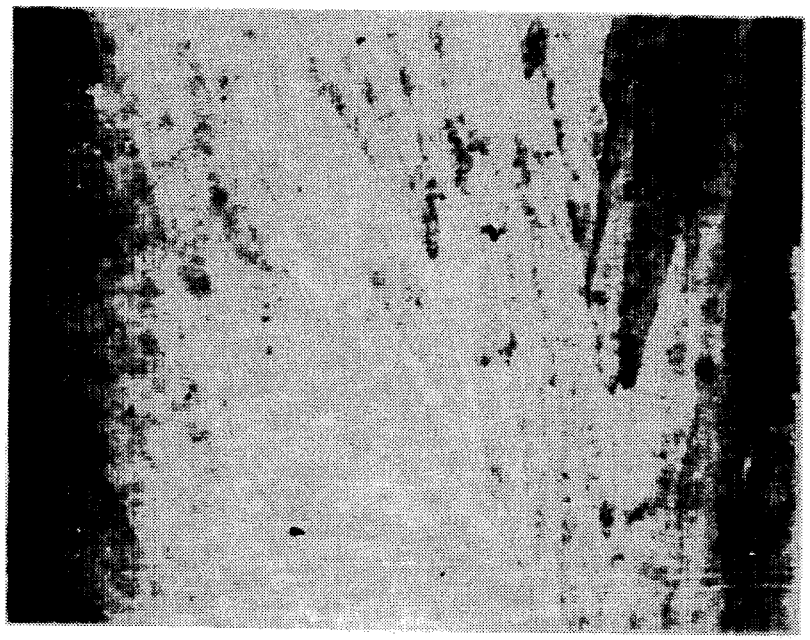
FIG. 2a is an optical micrograph of chill cast ternary eutectic solder at magnification of 50X. The sample was metallographically sectioned and etched with 2% HCl etch. The micrograph reveals multiple grains of very fine eutectic microstructure.
Figure 2B:
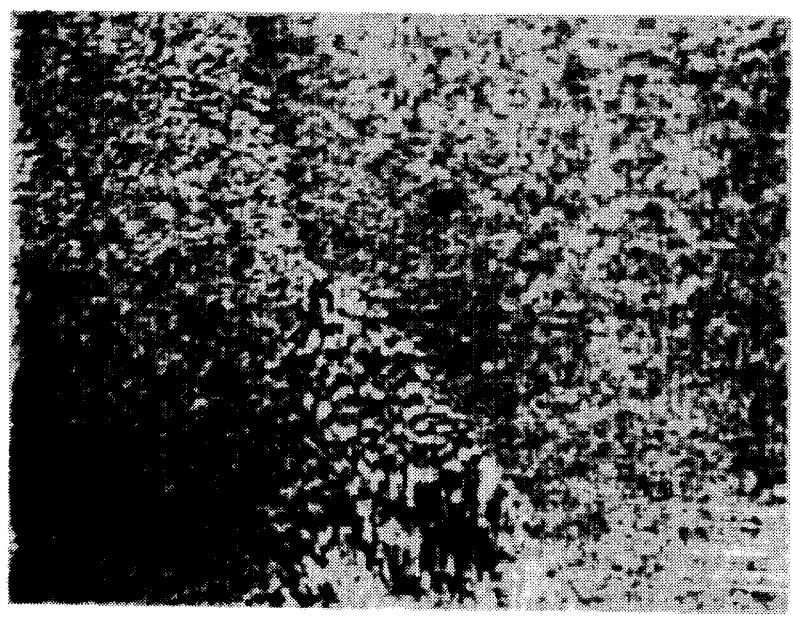
FIG. 2b is an enlarged (1000X) optical micrograph of the same sample as FIG. 2a showing the multiple phase ternary eutectic microstructure spacing.

FIGS. 2a–2b are photomicrographs at the magnifications indicated of the chill cast microstructure of the ternary eutectic solder (93.6 weight Sn-4.7 weight % Ag-1.7 weight % Cu). Foil rolled from the chill cast alloy was analyzed by X-ray diffraction technique. Two intermetallic compounds were present in the beta Sn matrix phase. One intermetallic compound included Cu and Sn; i.e. $Cu_6Sn_5$ and the other included Ag and Sn; i.e. $Ag_3Sn$. X-ray diffraction of rolled foil of the aforementioned plumbing Sn-Cu-Ag solder showed no evidence of the $Ag_3Sn$ compound, although the $Cu_6Sn_5$ was detected. The ingots can be processed by conventional techniques used for Sn-Pb eutectic solder to wire and sheet form. The ingots also can be used as melt stock to form solder powder by melt atomization techniques.

For example, solder powder of the invention can be produced as ultrafine rapidly solidified, generally spherical powder (powder particle diameter less than 25 microns) by high pressure gas atomization (HPGA). In particular, high pressure gas atomization apparatus of the type described in the Anderson U.S. Pat. No. 5,125,574 can be used to this end. For example, HPGA solder powder comprising the aforementioned ternary eutectic composition has been made from prealloyed ingot under the following atomization conditions using the atomization nozzle specifically described in the aforementioned U.S. Pat. No. 5,125,574, the teachings of which are incorporated herein by reference:

atomizing gas - - - argon atomizing gas pressure - - - 1100 psig melt pour temperature - - - 300° C. (immediate pour after reaching pour temperature)

melting atmosphere - - - argon

Such ultrafine rapidly solidified, generally spherical powder can be incorporated into electronic solder pastes for use in environmentally acceptable (Pb-free) circuit assembly by means of surface mount technology. Solder flux formulations for all forms of the solder of the invention can be selected from commercially available flux products or developed as necessary for a particular solder application. A solder flux acceptable for use with the solder of the invention in a hand solder application comprises a mildly activated rosin flux; e.g. Alpha 611 MA available from Alpha metals, Jersey City, N.J.

Solder powder pursuant to the invention can also be formed by other atomization processes including other high pressure close-coupled atomization processes using inert gas or air atomizing gas and low pressure, free-fall gas atomization processes. Water atomization, oil atomization, or centrifugal atomization may also be utilized to this end.

Figure 3A:
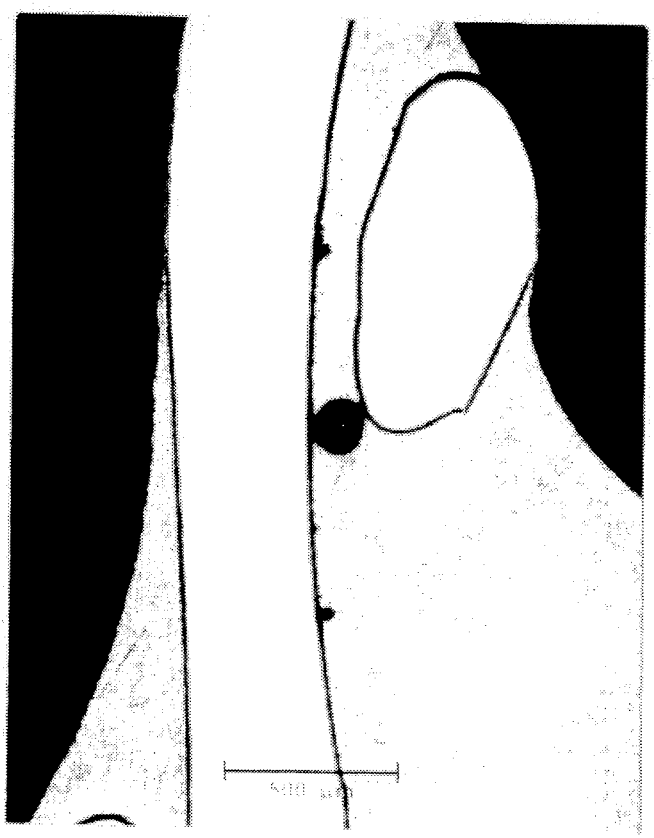
FIG. 3a is an optical micrograph of model solder joint made from twisted Cu wire pair immersed in molten ternary eutectic solder alloy at 250° C., then, withdrawn from the molten solder and air cooled. The sample was metallographically sectioned and etched with 2% HCl etch. The micrograph shows good wetting of fluxed wire by the solder alloy.
Figure 3B:
FIG. 3b is an enlarged optical micrograph of the same sample as FIG. 3b. The micrograph shows the interface of Cu wire at the bottom with intermetallic Sn-Cu phase growing into the solder matrix as well as a needle-like intermetallic compound, probably $Ag_3Sn$, and a globular intermetallic compound, probably $Cu_6Sn_5$, dispersed in the solder microstructure.

The solder of the invention provides a solder joint having a solidified ternary microstructure comprising beta Sn phase and at least two different, relatively hard intermetallic compounds, one compound including Cu and Sn (e.g. Cu-rich $Cu_6Sn_5$) and another compound including Ag and Sn (e.g. Ag-rich $Ag_3Sn$) distributed uniformly in the beta Sn phase. Referring to FIGS. 3a–3b, a solder joint produced by the aforementioned ternary eutectic solder of the invention is shown.

The solder joint microstructure includes the beta Sn phase matrix and two different dispersed intermetallic compounds. Namely, referring to FIG. 3b, the figure shows the interface of Cu wire at bottom with intermetallic Sn-Cu phase growing into the solder matrix. It also shows both needle-like Ag-Sn intermetallic phase and globular Cu-Sn intermetallic phase in the microstructure of the solder beta Sn matrix. These coarse intermetallic phases probably result from the slower cooling rate of the model solder joint compared to the chill casting of FIGS. 2a–2b.

The soldering process used involved heating the solder wire to 250° C., immersing a twisted copper wire pair that was fluxed with a $ZnCl_2$ flux in the molten ternary eutectic solder, withdrawing the wire from the molten solder, and solidifying the solder joint in air. This procedure is representative of typical wave and surface mount solder procedure in widespread use in the electronics industry.

The solidified microstructure of the invention comprising the beta Sn matrix phase and dispersed Cu-Sn and Ag-Sn intermetallic compounds provides greater solder joint strength and fatigue resistance as compared to the beta-Sn and soft alpha-Pb phases that characterize the eutectic microstructure of conventional Sn-Pb solders, even if both types of microstructures are highly refined. Moreover, the thermal stability of the solder joint microstructure of the invention is improved by the presence of the aforementioned hard intermetallic Ag-Sn and Cu-Sn compounds. In particular, thermally induced coarsening of the solder joint of the invention is substantially slower than the conventional Sn-Pb solder alloy by virtue of the microstructural stability of the hard Cu-Sn and Ag-Sn intermetallic compounds (e.g. $Cu_6Sn_5$ and $Ag_3Sn$, respectively) as compared to that of the Sn and Pb phases of the conventional binary solder alloy.

The solder of the invention is advantageous not only from an environmental standpoint (its Pb-free composition) but also from a cost and availability standpoint in that the Sn-Ag-Cu alloy is lower cost than the Pb-free solders including large amounts of Bi, In, Au or Ga developed to-date. The solder of the invention thus can become a direct replacement for the Sn-Pb solders currently in widespread use. Large volume solder applications especially will benefit from the low cost, high performance solder of the invention having the aforementioned advantages not possessed heretofore by other Pb-free solders.

While the invention has been described in terms of specific embodiments thereof, it is not intended to be limited thereto but rather only to the extent set forth hereafter in the following claims.

The embodiments of the invention in which an exclusive property or privilege is claimed are defined as follows:

1. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance.

2. The Pb-free solder of claim 1 further including at least one additional alloy component selected from the group consisting essentially of Si, Sb, Zn, Mg, Ca, a rare earth element, and misch metal in a collective amount not exceeding about 1 weight %.

3. The Pb-free solder of claim 1 further including an additional alloy component in an amount effective to lower the solder melting temperature range.

4. The Pb-free solder of claim 3 including Bi in an amount not exceeding about 10 weight %.

5. A Pb-free electrical conductor solder including a ternary eutectic composition consisting essentially of about 93.6 weight % Sn-about 4.7 weight % Ag-1.7 weight % Cu having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn.

6. The Pb-free solder of claim 5 further including Bi in an amount not exceeding about 10 weight %.

7. The Pb-free solder of claim 5 further including at least one alloy component selected form the group consisting essentially of Si, Sb, Zn, Mg, Ca, a rare earth element, and misch metal in a collective amount not exceeding about 1 weight %.

8. A Pb-free solder comprising a ternary eutectic composition consisting of about 93.6 weight % Sn-about 4.7 weight % Ag-about 1.7 weight % Cu having a melting temperature of about 217° C. wherein said composition promotes formation of intermetallic compounds that improve solder strength and fatigue resistance.

9. A solder joint comprising a Pb-free solder solidified in contact with an electrical conductor wherein said solder comprises a ternary eutectic composition consisting essentially of about 93.6 weight % Sn-about 4.7 weight % Ag-1.7 weight % Cu having a eutectic melting temperature of about 217° C. and variants of said ternary composition wherein the relative concentrations of Sn, Ag, and Cu deviate from said ternary composition to provide a controlled liquid plus solid temperature range with a liquidus temperature not exceeding 15° C. above said eutectic melting temperature, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase.

10. The solder joint of claim 9 wherein the solder includes an alloy component in an amount effective to lower the solder melting temperature range.

11. The solder joint of claim 9 wherein the solder includes Bi in an amount not exceeding about 10 weight %.

12. The solder joint of claim 9 wherein the solder includes at least one alloy component selected from the group consisting essentially of Si, Sb, Zn, Mg, Ca, a rare earth element, and misch metal in a collective amount not exceeding about 1 weight %.

13. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase.

14. A solder joint comprising a Pb-free solder ternary eutectic composition solidified in contact with an electrical conductor and consisting of about 4.7 weight % Ag, about 1.7 weight % Cu and the balance Sn wherein intermetallic compounds are formed in said solder for improving solder joint strength and fatigue resistance.

15. In a soldering process involving solidifying a molten solder, the improvement comprising solidifying a Pb-free solder comprising a ternary eutectic composition consisting essentially of about 93.6 weight % Sn-about 4.7 weight % Ag-1.7 weight % Cu having a eutectic melting temperature of about 217° C. and variants of said ternary composition wherein the relative concentrations of Sn, Ag, and Cu deviate from said ternary composition to provide a controlled liquid-solid temperature range with a liquidus temperature not exceeding 15° C. above said eutectic melting temperature and upon solidification at least two intermetallic compounds, one intermetallic compound including Cu and Sn and another intermetallic compound including Ag and Sn, dispersed in a beta Sn matrix phase.

16. In a soldering process involving solidifying a molten solder about copper electrical conductors, the improvement comprising solidifying a Pb-free solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn.

17. In a soldering process involving solidifying a molten solder, the improvement comprising solidifying a molten Pb-free solder consisting of about 4.7 weight % Ag, about 1.7 weight % Cu and the balance Sn including forming in said solidified solder intermetallic compounds that improve solder strength and fatigue resistance.

18. A Pb-free solder consisting of about 3.6 to about 4.7 weight % Ag, about 0.9 to about 1.7 weight Cu, and the balance Sn in an amount to promote formation of intermetallic compounds that improve solder strength and fatigue resistance.

19. A solder joint comprising a Pb-free solder solidified in contact with an electrical conductor and consisting of about 3.6 to about 4.7 weight % Ag, about 0.9 to about 1.7 weight Cu, and the balance Sn in an amount to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn.

20. In a soldering process involving solidifying a molten solder, the improvement comprising solidifying a Pb-free solder consisting of about 3.6 to about 4.7 weight % Ag, about 0.9 to about 1.7 weight % Cu and the balance Sn in an amount to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn.

* * * * *

UNITED STATES PATENT AND TRADEMARK OFFICE
CERTIFICATE OF CORRECTION

PATENT NO. : 5,527,628 C1
APPLICATION NO. : 90/008427
DATED : March 10, 2009
INVENTOR(S) : Iver E. Anderson It is certified that error appears in the above-identified patent and that said Letters Patent is hereby corrected as shown below:

Column 1, line 45, after "Sn" please insert --and--;

Column 1, line 53, after "weight" please insert --%--;

Column 4, line 1, please delete "solidfying" and insert --solidifying-- therefor;

Column 4, line 24, please delete "solidfying" and insert --solidifying-- therefor;

Column 10, line 42, please delete "and";

Column 10, line 62, before "solder" please insert --electrical conductor--;

Column 10, line 63, please delete "7.7 % weight Ag" and insert --7.7 weight % Ag-- therefor;

Column 11, line 32, after "wherein" please insert --the--;

Column 11, line 38, please delete "125" and insert --135-- therefor;

Column 11, line 48, after "wherein" please insert --the--;

Column 13, line 15, after "balance" please insert --essentially--;

Column 15, line 31, please delete "Su" and insert --Sn-- therefor;

Column 17, line 1, please delete "joint comprising" and insert --solder consisting-- therefor;

UNITED STATES PATENT AND TRADEMARK OFFICE
CERTIFICATE OF CORRECTION

PATENT NO. : 5,527,628 C1
APPLICATION NO. : 90/008427
DATED : March 10, 2009
INVENTOR(S) : Iver E. Anderson It is certified that error appears in the above-identified patent and that said Letters Patent is hereby corrected as shown below:

Column 17, line 20, after "with" please insert --the--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 5,527,628 C1
APPLICATION NO. : 90/008427
DATED : March 10, 2009
INVENTOR(S) : Iver E. Anderson et al.

It is certified that error appears in the above-identified patent and that said Letters Patent is hereby corrected as shown below:

Title Page, Item [73] Assignee, please delete "Tamura Kaken Corporation, Iruma-shi, Saitama (JP)" and insert --Iowa State University Research Foundation, Inc., Ames, Iowa; Sandia Corporation, Albuquerque, N.M.--

Signed and Sealed this

Thirteenth Day of July, 2010

David J. Kappos
*Director of the United States Patent and Trademark Office*

(12) EX PARTE REEXAMINATION CERTIFICATE (6694th)
United States Patent
Anderson et al.

(10) Number: US 5,527,628 C1
(45) Certificate Issued: Mar. 10, 2009

(54) PB-FREE SN-AG-CU TERNARY EUTECTIC SOLDER

(75) Inventors: Iver E. Anderson, Ames, IA (US); Frederick G. Yost, Cedar Crest, NM (US); John F. Smith, Ames, IA (US); Chad M. Miller, Ames, IA (US); Robert L. Terpstra, Ames, IA (US)

(73) Assignee: Tamura Kaken Corporation, Iruma-shi, Saitama (JP)

Reexamination Request:
No. 90/008,427, Jan. 17, 2007

Reexamination Certificate for:
Patent No.: 5,527,628
Issued: Jun. 18, 1996
Appl. No.: 08/394,228
Filed: Feb. 24, 1995

Related U.S. Application Data

(63) Continuation of application No. 08/094,854, filed on Jul. 20, 1993, now abandoned.

(51) Int. Cl.
*B23K 35/26* (2006.01)

(52) U.S. Cl. ............... 428/647; 228/262.9; 420/560
(58) Field of Classification Search .............. None
See application file for complete search history.

(56) References Cited

U.S. PATENT DOCUMENTS

| | | | | |
|---|---|---|---|---|
| 4,695,428 A | 9/1987 | Ballentine et al. | ........... | 420/561 |
| 4,778,733 A | 10/1988 | Lubrano et al. | ........... | 428/647 |
| 4,879,096 A | 11/1989 | Naton | ........... | 420/561 |
| 5,352,407 A | 10/1994 | Seelig et al. | ........... | 420/561 |
| 5,527,628 A | 6/1996 | Anderson et al. | ........... | 428/647 |

FOREIGN PATENT DOCUMENTS

| | | |
|---|---|---|
| JP | SHO-50-82884 | 1/1977 |
| JP | 05-05286 | 3/1993 |
| JP | 05050286 A * | 3/1993 |

OTHER PUBLICATIONS

Merriam–Webster's Collegiate Dictionary, Merriam–Webster, Inc. Tenth Edition, 1998, p. 241.*

"Effect of Cu Concentration on Morphology of Sn–Ag–Cu Solders by Mechanical Alloying", by Kao et al. et al., for *Journal of Electronic Materials*, Dec. 2004, pp. 1445–1451.

Ishikawa, et al., "Research into Reliability of Solder Joints of Surface–Mounted Devices", The Fourth Reliability Engineering Symposium of the Reliability Engineering Association of Japan, published 1991, vol. 3, No. 3, Japanese language version and English translation.

"Lead–Free Electronics", Ganesan, S. and Pecht, M., Eds., 2004 Edition, pp. 51–53.

Vincent, J.H. et al., "Alternative Solders for Electronics Assemblies", *Circuit World*, vol. 19, No. 3, 1993, pp. 30–34.

Barham, B.S., "Soft Solders for Use at Elevated Temperatures", *The Metal Industry*, 1938, pp. 521–523.

Gebhardt, V.E. and Petzow, G., "Über den Aufbau des Systems–Silber Kupfer–Zinn", Zeitschrift Fur Metallkunde, Band 50, Heft 10, 1959, pp. 597–605, German language version and English language version.

* cited by examiner

*Primary Examiner*—Stephen Stein

(57) ABSTRACT

A Pb-free solder includes a ternary eutectic composition consisting essentially of about 93.6 weight % Sn—about 4.7 weight % Ag—about 1.7 weight % Cu having a eutectic melting temperature of about 217° C. and variants of the ternary composition wherein the relative concentrations of Sn, Ag, and Cu deviate from the ternary eutectic composition to provide a controlled melting temperature range (liquid-solid "mushy" zone) relative to the eutectic melting temperature (e.g. up to 15° C. above the eutectic melting temperature).

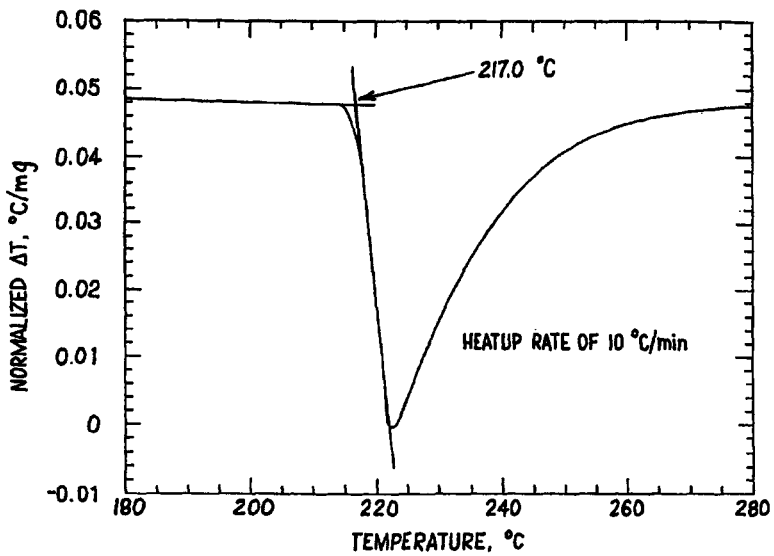

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 18–20 is confirmed.

Claims 1, 13 and 16 are determined to be patentable as amended.

Claims 2–4, dependent on an amended claim, are determined to be patentable.

New claims 21–241 are added and determined to be patentable.

Claims 5–12, 14, 15 and 17 were not reexamined.

1. A Pb-free electrical conductor solder *that is solidified on an electrical wiring board, the solder* consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance.

13. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn another intermetallic compound including Ag and Sn, distributed uniformly in the beta Sn matrix phase, *wherein the Pb-free solder is solidified on an electrical wiring board.*

16. In a soldering process involving solidifying a molten solder about copper electrical conductors, the improvement comprising solidifying a Pb-free solder consisting essentially of about 3.5 to about 7.7 weight Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, *wherein the Pb-free solder is solidified on an electrical wiring board.*

*21. The Pb-free solder of claim 1, wherein the electrical conductor solder is incorporated into an electronic solder paste of a circuit assembly.*

*22. The Pb-free solder of claim 21, wherein the circuit assembly is surface mounted with the electronic solder paste.*

*23. The Pb-free solder of claim 1, wherein the electrical conductor solder comprises solder powder particles having a generally spherical shape and a powder particle diameter of less than 25 microns.*

*24. The Pb-free solder of claim 23, wherein the solder powder particles are incorporated into an electronic solder paste of a circuit assembly.*

*25. The Pb-free solder of claim 24, wherein the circuit assembly is surface mounted with the electronic solder paste.*

*26. The Pb-free solder of claim 1, wherein the weight % Ag is substantially greater than the weight % Cu.*

*27. The Pb-free solder of claim 1, wherein the solder comprises about 3.6 to about 4.7 weight % Ag.*

*28. The Pb-free solder of claim 27, wherein the Pb-free solder comprises about 3.6 weight % Ag.*

*29. The Pb-free solder of claim 27, wherein the solder comprises about 93.6 to about 95.0 weight % Sn.*

*30. The Pb-free solder of claim 1, wherein the solder comprises about 93.6 to about 95.0 weight % Sn.*

*31. The Pb-free solder of claim 1, wherein the solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn.*

*32. The Pb-free solder of claim 31, wherein the intermetallic compound including Ag and Sn comprises $Ag_3Sn$.*

*33. The Pb-free solder of claim 31, wherein the intermetallic compound including Cu and Sn comprises $Cu_6Sn_5$.*

*34. The Pb-free solder of claim 31, wherein the at least two intermetallic compounds provide improved thermal stability by slowing thermally induced coarsening.*

*35. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed* uniformly in the beta Sn matrix phase, wherein the Pb-free solder is solidified onto a copper wire pair.

36. The Pb-free solder of claim 35, wherein the copper wire pair includes a twisted copper wire pair, the electrical conductor solder being joined at an interface of the twisted copper wire pair.

37. The Pb-free solder of claim 36, wherein the Pb-free solder is solidified in air when joined to the copper wire pair.

38. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase, wherein the Pb-free solder is solidified to a circuit assembly.

39. The solder joint of claim 38, wherein the circuit assembly is surface mounted with the Pb-free solder.

40. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase, wherein the Pb-free solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

41. A solder joint comprising a Pb-free solder solidified about copper electrical conductors and consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

42. In a soldering process involving solidfying a molten solder about copper electrical conductors, the improvement comprising solidifying a Pb-free solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, wherein the Pb-free solder is solidified onto a copper wire pair.

43. The soldering process of claim 42, wherein the copper wire pair includes a twisted copper wire pair, the electrical conductor solder being joined at an interface of the twisted copper wire pair.

44. The soldering process of claim 43, wherein the Pb-free solder is solidified in air when joined to the copper wire pair.

45. In a soldering process involving solidfying a molten solder about copper electrical conductors, the improvement comprising solidifying a Pb-free solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, wherein the Pb-free solder is solidified to a circuit assembly.

46. The soldering process of claim 45, wherein the circuit assembly is surface mounted with the Pb-free solder.

47. In a soldering process involving solidifying a molten solder about copper electrical conductors, the improvement comprising solidifying a Pb-free solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, wherein the Pb-free solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

48. In a soldering process involving solidifying a molten solder about copper electrical conductors, the improvement comprising solidifying a Pb-free solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

49. The Pb-free solder of claim 18, wherein the solder is solidified on an electrical wiring board.

50. The Pb-free solder of claim 18, wherein the solder is joined to a copper wire pair.

51. The Pb-free solder of claim 50, wherein the copper wire pair includes a twisted copper wire pair, the solder being joined at an interface of the twisted copper wire pair.

52. The Pb-free solder of claim 51, wherein the solder is solidified in air when joined to the copper wire pair.

53. The Pb-free solder of claim 18, wherein the solder is incorporated into an electronic solder paste of a circuit assembly.

54. The Pb-free solder of claim 53, wherein the circuit assembly is surface mounted with the electronic solder paste.

55. The Pb-free solder of claim 18, wherein the solder comprises solder powder particles having a generally spherical shape and a powder particle diameter of less than 25 microns.

56. The Pb-free solder of claim 55, wherein the solder powder particles are incorporated into an electronic solder paste of a circuit assembly.

57. The Pb-free solder of claim 56, wherein the circuit assembly is surface mounted with the electronic solder paste.

58. The Pb-free solder of claim 18, wherein the solder comprises about 3.6 weight % Ag.

59. The Pb-free solder of claim 18, wherein the solder comprises about 93.6 to about 95.0 weight % Sn.

60. The Pb-free solder of claim 18, wherein the solder consists of a ternary eutectic composition of about 3.6 to about 4.7 % weight % Ag, about 0.9 to about 1.7 weight % Cu, and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C above said eutectic melting temperature and at least two intermetallic compounds dispersed in a beta Sn matrix wherein one intermetallic compound includes Cu and Sn and another intermetallic compound includes Ag and Sn.

61. The Pb-free solder of claim 60, wherein the intermetallic compound including Ag and Sn comprises $Ag_3Sn$.

62. The Pb-free solder of claim 60, wherein the intermetallic compound including Cu and Sn comprises $Cu_6Sn_5$.

63. The solder joint of claim 19, wherein the Pb-free solder is solidified on an electrical wiring board.

64. The solder joint of claim 19, wherein the Pb-free solder is solidified onto a copper wire pair.

65. The Pb-free solder of claim 64, wherein the copper wire pair includes a twisted copper wire pair, the electrical conductor solder being joined at an interface of the twisted copper wire pair.

66. The Pb-free solder of claim 65, wherein the Pb-free solder is solidified in air when joined to the copper wire pair.

67. The solder joint of claim 19, wherein the Pb-free solder is solidified to a circuit assembly.

68. The solder joint of claim 67, wherein the circuit assembly is surface mounted with the Pb-free solder.

69. The solder joint of claim 19, wherein the Pb-free solder comprises about 3.6 weight % Ag.

70. The solder joint of claim 19, wherein the Pb-free solder comprises about 93.6 to about 95.0 weight % Sn.

71. The solder joint of claim 19, wherein the Pb-free solder consists of a ternary eutectic composition of about 3.6 to about 4.7 weight % Ag, about 0.9 to about 1.7 weight % Cu, and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

72. The solder joint of claim 19, wherein the intermetallic compound including Ag and Sn comprises $Ag_3Sn$.

73. The solder joint of claim 19, wherein the intermetallic compound including Cu and Sn comprises $Cu_6Sn_5$.

74. The soldering process of claim 20, wherein the Pb-free solder is solidified on an electrical wiring board.

75. The soldering process of claim 20, wherein the Pb-free solder is solidified onto a copper wire pair.

76. The soldering process of claim 75, wherein the copper wire pair includes a twisted copper wire pair, the electrical conductor solder being joined at an interface of the twisted copper wire pair.

77. The soldering process of claim 76, wherein the Pb-free solder is solidified in air when joined to the copper wire pair.

78. The soldering process of claim 20, wherein the Pb-free solder is solidified to a circuit assembly.

79. The soldering process of claim 78, wherein the circuit assembly is surface mounted with the Pb-free solder.

80. The soldering process of claim 20, wherein the Pb-free solder comprises about 3.6 weight % Ag.

81. The soldering process of claim 20, wherein the Pb-free solder comprises about 93.6 to about 95.0 weight % Sn.

82. The soldering process of claim 20, wherein the Pb-free solder consists of a ternary eutectic composition of about 3.6 to about 4.7 weight % Ag, about 0.9 to about 1.7 weight % Cu and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

83. The soldering process of claim 20, wherein the intermetallic compound including Ag and Sn comprises $Ag_3Sn$.

84. The soldering process of claim 20, wherein the intermetallic compound including Cu and Sn comprises $Cu_6Sn_5$.

85. A Pb-free electrical conductor solder consisting essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn, wherein Sn is present in an amount of at least about 89 weight % Sn to promote formation of intermetallic compounds that improve solder strength and fatigue resistance.

86. The Pb-free solder of claim 85, wherein the electrical conductor solder is joined to a copper wire pair, and wherein the copper wire pair includes a twisted copper wire pair, the electrical conductor solder being joined at an interface of the twisted copper wire pair.

87. The Pb-free solder of claim 86, wherein the electrical conductor solder is solidified in air when joined to the copper wire pair.

88. The Pb-free solder of claim 85, wherein the electrical conductor solder is incorporated into an electronic solder paste of a circuit assembly, and wherein the circuit assembly is surface mounted with the electronic solder paste.

89. The Pb-free solder of claim 85, wherein the electrical conductor solder comprises solder powder particles having a generally spherical shape and a powder particle diameter of less than 25 microns, and wherein the solder powder particles are incorporated into an electronic solder paste of a circuit assembly.

90. The Pb-free solder of claim 89, wherein the circuit assembly is surface mounted with the electronic solder paste.

91. The Pb-free solder of claim 85, wherein the weight % Ag is substantially greater than the weight % Cu.

92. The Pb-free solder of claim 85, wherein the solder comprises about 3.6 to about 4.7 weight % Ag.

93. The Pb-free solder of claim 92, wherein the solder comprises about 3.6 weight % Ag.

94. The Pb-free solder of claim 92, wherein the solder comprises about 93.6 to about 95.0 weight % Sn.

95. The Pb-free solder of claim 85, wherein the intermetallic compound including Ag and Sn comprises $Ag_3Sn$.

96. The Pb-free solder of claim 85, wherein the intermetallic compound including Cu and Sn comprises $Cu_6Sn_5$.

97. The Pb-free solder of claim 85 further including at least one additional alloy component selected from the group consisting essentially of Si, Sb, Zn, Mg, Ca, a rare earth element, and misch metal in a collective amount not exceeding about 1 weight %.

98. The Pb-free solder of claim 85 further including an additional alloy component in an amount effective to lower the solder melting temperature range.

99. The Pb-free solder of claim 98 including Bi in an amount not exceeding about 10 weight %.

100. A Pb-free electrical conductor solder that is joined to a copper wire pair, the solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance.

101. The Pb-free solder of claim 100, wherein the copper wire pair includes a twisted copper wire pair, the electrical conductor solder being joined at an interface of the twisted copper wire pair.

102. The Pb-free solder of claim 101, wherein the electrical conductor solder is solidified in air when joined to the copper wire pair.

103. The Pb-free solder of claim 100 further including at least one additional alloy component selected from the group consisting essentially of Si, Sb, Zn, Mg, Ca, a rare earth element, and misch metal in a collective amount not exceeding about 1 weight %.

104. The Pb-free solder of claim 100 further including an additional alloy component in an amount effective to lower the solder melting temperature range.

105. The Pb-free solder of claim 104 including Bi in an amount not exceeding about 10 weight %.

106. The Pb-free solder of claim 100, wherein the weight % Ag is substantially greater than the weight % Cu.

107. The Pb-free solder of claim 100, wherein the solder comprises about 3.6 to about 4.7 weight % Ag.

108. The Pb-free solder of claim 107, wherein the solder comprises about 3.6 weight % Ag.

109. The Pb-free solder of claim 107, wherein the solder comprises about 93.6 to about 95.0 weight % Sn.

110. The Pb-free solder of claim 100, wherein the solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn.

111. The Pb-free solder of claim 110, wherein the intermetallic compound including Ag and Sn comprises $Ag_3Sn$.

112. The Pb-free solder of claim 110, wherein the intermetallic compound including Cu and Sn comprises $Cu_6Sn_5$.

113. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, the electrical conductor solder being incorporated into an electronic solder paste of a circuit assembly.

114. The Pb-free solder of claim 113, wherein the electrical conductor solder is solidified on an electrical wiring board.

115. The Pb-free solder of claim 113, wherein the circuit assembly is surface mounted with the electronic solder paste.

116. The Pb-free solder of claim 113 further including at least one additional alloy component selected from the group consisting essentially of Si, Sb, Zn, Mg, Ca, a rare earth element, and misch metal in a collective amount not exceeding about 1 weight %.

117. The Pb-free solder of claim 113 further including an additional alloy component in an amount effective to lower the solder melting temperature range.

118. The Pb-free solder of claim 117 including Bi in an amount not exceeding about 10 weight %.

119. The Pb-free solder of claim 113, wherein the weight % Ag is substantially greater than the weight % Cu.

120. The Pb-free solder of claim 113, wherein the solder comprises about 3.6 to about 4.7 weight % Ag.

121. The Pb-free solder of claim 120, wherein the solder comprises about 3.6 weight % Ag.

122. The Pb-free solder of claim 120, wherein the solder comprises about 93.6 to about 95.0 weight % Sn.

123. The Pb-free solder of claim 113, wherein the solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn.

124. The Pb-free solder of claim 123, wherein the intermetallic compound including Ag and Sn comprises $Ag_3Sn$.

125. The Pb-free solder of claim 123, wherein the intermetallic compound including Cu and Sn comprises $Cu_6Sn_5$.

126. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, the electrical conductor solder comprising solder powder particles having a generally spherical shape and a powder particle diameter of less than 25 microns, wherein the solder powder particles are incorporated into an electronic solder paste of a circuit assembly.

127. The Pb-free solder of claim 126, wherein the circuit assembly is surface mounted with the electronic solder paste.

128. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, the electrical conductor solder comprising solder powder particles having a generally spherical shape and a powder particle diameter of less than 25 microns, and wherein the solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C above said eutectic melting temperature and at least two intermetallic compounds dispersed in a beta Sn matrix wherein one intermetallic compound includes Cu and Sn and another intermetallic compound includes Ag and Sn.

129. The Pb-free solder of claim 128, wherein the intermetallic compound including Ag and Sn comprises $Ag_3Sn$.

130. The Pb-free solder of claim 128, wherein the intermetallic compound including Cu and Sn comprises $Cu_6Sn_5$.

131. A Pb-free solder consisting essentially of about 3.5 to about 7.7 % weight Ag, about 1.0 to about 4.0 weight % Cu and the balance essentially Sn wherein Sn is present in an amount of at least about 89 weight % Sn to promote formation of intermetallic compounds that improve solder strength and fatigue resistance, wherein the solder comprises about 3.6 to about 4.7 weight % Ag and wherein the weight % Ag is substantially greater than the weight % Cu, wherein the electrical conductor solder is solidified on an electrical wiring board.

132. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, wherein the solder comprises about 3.6 to about 4.7 weight % Ag and wherein the weight % Ag is substantially greater than the weight % Cu, wherein the electrical conductor solder is joined to a copper wire pair.

133. The Pb-free solder of claim 132, wherein the copper wire pair includes a twisted copper wire pair, the electrical conductor solder being joined at an interface of the twisted copper wire pair.

134. The Pb-free solder of claim 133, wherein the electrical conductor solder is solidified in air when joined to the copper wire pair.

135. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, wherein solder comprises about 3.6 to about 4.7 weight % Ag and wherein the weight % Ag is substantially greater than the weight % Cu, wherein the electrical conductor solder is incorporated into an electronic solder paste of a circuit assembly.

136. The Pb-free solder of claim 125, wherein the circuit assembly is surface mounted with the electronic solder paste.

137. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, wherein solder comprises about 3.6 to about 4.7 weight % Ag and wherein the weight % Ag is substantially greater than the weight % Cu, wherein the electrical conductor solder comprises solder powder particles having a generally spherical shape and a powder particle diameter of less than 25 microns, and wherein the solder powder particles are incorporated into an electronic solder paste of a circuit assembly.

138. The Pb-free solder of claim 137, wherein the circuit assembly is surface mounted with the electronic solder paste.

139. A Pb-free electrical conductor solder consisting essentially of about 3.5 to about 7.7 weight % Ag, about 1.0 to about 4.0 weight % Cu and the balance essentially Sn wherein Sn is present in an amount of at least about 89 weight % Sn to promote formation of intermetallic compounds that improve solder strength and fatigue resistance, wherein the solder comprises about 3.6 to about 4.7 weight % Ag and wherein the weight % Ag is substantially greater than the weight % Cu, wherein the solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C above said eutectic melting temperature and at least two intermetallic compounds dispersed in a beta Sn matrix wherein one intermetallic compound includes Cu and Sn and another intermetallic compound includes Ag and Sn.

140. The Pb-free solder of claim 139, wherein the intermetallic compound including Ag and Sn comprises $Ag_3Sn$.

141. The Pb-free solder of claim 139, wherein the intermetallic compound including Cu and Sn comprises $Cu_6Sn_5$.

142. A Pb-free electrical conductor solder consisting essentially of about 3.5 to about 7.7 weight % Ag, about 1.0 to about 4.0 weight % Cu, at least one additional alloy component selected from the group consisting essentially of Si, Sb, Zn, Mg, Ca, a rare earth element, and misch metal in a collective amount not exceeding about 1 weight %, Bi in an amount not exceeding about 10 weight %, and the balance essentially Sn wherein Sn is present in an amount of at least about 89 weight % Sn to promote formation of intermetallic compounds that improve solder strength and fatigue resistance.

143. The Pb-free solder of claim 142, wherein the electrical conductor solder is solidified on an electrical wiring board.

144. The Pb-free solder of claim 142, wherein the electrical conductor solder is joined to a copper wire pair.

145. The Pb-free solder of claim 144, wherein the copper wire pair includes a twisted copper wire pair, the electrical conductor solder being joined at an interface of the twisted copper wire pair.

146. The Pb-free solder of claim 145, wherein the electrical conductor solder is solidified in air when joined to the copper wire pair.

147. The Pb-solder of claim 142, wherein the electrical conductor solder is incorporated into an electronic solder paste of a circuit assembly.

148. The Pb-free solder of claim 147, wherein the circuit assembly is surface mounted with the electronic solder paste.

149. The Pb-free solder of claim 142, wherein the electrical conductor solder comprises solder powder particles having a generally spherical shape and a powder particle diameter of less than 25 microns.

150. The Pb-free solder of claim 149, wherein the solder powder particles are incorporated into an electronic solder paste of a circuit assembly.

151. The Pb-free solder of claim 150, wherein the circuit assembly is surface mounted with the electronic solder paste.

152. The Pb-free solder of claim 142, wherein the weight % Ag is substantially greater than the weight % Cu.

153. The Pb-free solder of claim 142, wherein the solder comprises about 3.6 to about 4.7 weight % Ag.

154. The Pb-free solder of claim 153, wherein the solder comprises about 3.6 weight % Ag.

155. The Pb-free solder of claim 153, wherein the solder comprises about 93.6 to about 95.0 weight % Sn.

156. The Pb-free solder of claim 142, wherein the solder consists essentially of a ternary eutectic composition of about 3.5 to about 7.7 weight % Ag, about 1.0 to about 4.0 weight % Cu and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature and at least two intermetallic compounds dispersed in a beta Sn matrix wherein one intermetallic compound includes Cu and Sn and another intermetallic compound includes Ag and Sn.

157. The Pb-free solder of claim 156, wherein the intermetallic compound including Ag and Sn comprises $Ag_3Sn$.

158. The Pb-free solder of claim 156, wherein the intermetallic compound including Cu and Sn comprises $Cu_6Sn_5$.

159. A solder joint comprising:
a Pb-free solder solidified on an electrical wiring board about copper electrical conductors, and
the Pb-free solder consisting essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature,
wherein Sn is present in an amount of at least about 89 weight % Sn to promote formation of intermetallic compounds that improve solder strength and fatigue resistance, said solder joint having a microstucture comprising beta Sn phase matrix and at least two intermetallic compounds, one intermetallic compound including Cu and Sn and another intermetallic compound including Ag and Sn, distributed uniformly in the beta Sn matrix phase.

160. The solder joint of claim 159, wherein the Pb-free solder is solidified to a circuit assembly.

161. The solder joint of claim 160, wherein the circuit assembly is surface mounted with the Pb-free solder.

162. The solder joint of claim 159, wherein the weight % Ag is substantially greater than the weight % Cu.

163. The solder joint of claim 159, wherein the Pb-free solder comprises about 3.6 to about 4.7 weight % Ag.

164. The solder joint of claim 163, wherein the Pb-free solder comprises about 3.6 weight % Ag.

165. The solder joint of claim 163, wherein the Pb-free solder comprises about 93.6 to about 95.0 weight % Sn.

166. The solder joint of claim 159, wherein the intermetallic compound including Ag and Sn comprises $Ag_3Sn$.

167. The solder joint of claim 159, wherein the intermetallic compound including Cu and Sn comprises $Cu_6Sn_5$.

168. The solder joint of claim 159, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

169. The solder joint of claim 159, wherein the Pb-free solder further includes at least one additional alloy component selected from the group consisting essentially of Si, Sb, Zn, Mg, Ca, a rare earth element, and misch metal in a collective amount not exceeding about 1 weight %.

170. The solder joint of claim 159, wherein the Pb-free solder further includes an additional alloy component in an amount effective to lower the solder melting temperature range.

171. The solder joint of claim 170, wherein the Pb-free solder includes Bi in an amount not exceeding about 10 weight %.

172. A solder joint comprising:
a Pb-free solder solidified on an electrical wiring board about copper electrical conductors, and
the Pb-free solder consisting essentially of about 3.5 to about 7.7 weight % Ag, about 1.0 to about 4.0 weight % Cu and the balance essentially Sn in an amount of at least 89 weight % Sn to promote formation of intermetallic compounds that improve solder strength and fatigue resistance, said solder joint having a microstructure comprising beta Sn phase matrix and at least two intermetallic compounds, one intermetallic compound including Cu and Sn and another intermetallic compound including Ag and Sn, distributed uniformly in the beta Sn matrix phase, wherein the weight % Ag is substantially greater than the weight % Cu.

173. The solder joint of claim 172, wherein the Pb-free solder is solidified to a circuit assembly.

174. The solder joint of claim 173, wherein the circuit assembly is surface mounted with the Pb-free solder.

175. The solder joint of claim 172, wherein the Pb-free solder comprises about 3.6 to about 4.7 weight % Ag.

176. The solder joint of claim 175, wherein the Pb-free solder comprises about 3.6 weight % Ag.

177. The solder joint of claim 175, wherein the Pb-free solder comprises about 93.6 to about 95.0 weight % Sn.

178. The solder joint of claim 172, wherein the Pb-free solder further includes at least one additional alloy component selected from the group consisting essentially of Si, Sb, Zn, Mg, Ca, a rare earth element, and misch metal in a collective amount not exceeding about 1 weight %.

179. The solder joint of claim 172, wherein the Pb-free solder further includes an additional alloy component in an amount effective to lower the solder melting temperature range.

180. The solder joint of claim 179, wherein the Pb-free solder includes Bi in an amount not exceeding about 10 weight %.

181. The solder joint of claim 172, wherein the Pb-free solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

182. The solder joint of claim 172, wherein the intermetallic compound including Ag and Sn comprises $Ag_3Sn$.

183. The solder joint of claim 172, wherein the intermetallic compound including Cu and Sn comprises $Cu_6Sn_5$.

184. The solder joint of claim 172, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

185. In a soldering process involving solidifying a molten solder about copper electrical conductors, the improvement comprising:

solidifying a Pb-free solder on an electrical wiring board, the Pb-free solder consisting essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature, wherein Sn is present in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Su and another intermetallic compound includes Ag and Sn.

186. The soldering process of claim 185, wherein the Pb-free solder is solidified to a circuit assembly.

187. The soldering process of claim 186, wherein the circuit assembly is surface mounted with the Pb-free solder.

188. The soldering process of claim 185, wherein the weight % Ag is substantially greater than the weight % Cu.

189. The soldering process of claim 185, wherein the Pb-free solder comprises about 3.6 to about 4.7 weight % Ag.

190. The soldering process of claim 189, wherein the Pb-free solder comprises about 3.6 weight % Ag.

191. The soldering process of claim 189, wherein the Pb-free solder comprises about 93.6 to about 95.0 weight % Sn.

192. The soldering process of claim 185, wherein the intermetallic compound including Ag and Sn comprises $Ag_3Sn$.

193. The soldering process of claim 185, wherein the intermetallic compound including Cu and Sn comprises $Cu_6Sn_5$.

194. The soldering process of claim 185, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

195. The soldering process of claim 185, wherein the Pb-free solder further includes at least one additional alloy component selected from the group consisting essentially of Si, Sb, Zn, Mg, Ca, a rare earth element, and misch metal in a collective amount not exceeding about 1 weight %.

196. The soldering process of claim 185, wherein the Pb-free solder further includes an additional alloy component in an amount effective to lower the solder melting temperature range.

197. The soldering process of claim 196, wherein the Pb-free solder includes Bi in an amount not exceeding about 10 weight %.

198. In a soldering process involving solidifying a molten solder about copper electrical conductors, the improvement comprising:

solidifying a Pb-free solder on an electrical wiring board, the Pb-free solder consisting essentially of about 3.5 to about 7.7 weight % Ag, about 1.0 to about 4.0 weight % Cu and the balance essentially Sn in an amount of at least about 89 weight % Sn to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn, wherein the weight % Ag of the Pb-free solder is substantially greater than the weight % Cu of the Pb-free solder.

199. The soldering process of claim 198, wherein the Pb-free solder is solidified to a circuit assembly.

200. The soldering process of claim 199, wherein the circuit assembly is surface mounted with the Pb-free solder.

201. The soldering process of claim 198, wherein the Pb-free solder comprises about 3.6 to about 4.7 weight % Ag.

202. The soldering process of claim 201, wherein the Pb-free solder comprises about 3.6 weight % Ag.

203. The soldering process of claim 201, wherein the Pb-free solder comprises about 93.6 to about 95.0 weight % Sn.

204. The soldering process of claim 198, wherein the Pb-free solder consists essentially of a ternary eutectic composition of about 3.5 to about 7.7 weight % Ag, about 1.0 to about 4.0 weight % Cu and the balance essentially Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature.

205. The soldering process of claim 198, wherein the intermetallic compound including Ag and Sn comprises $Ag_3Sn$.

206. The soldering process of claim 198, wherein the intermetallic compound including Cu and Sn comprises $Cu_6Sn_5$.

207. The soldering process of claim 198, wherein the Pb-free solder further includes at least one additional alloy component selected from the group consisting essentially of Si, Sb, Zn, Mg, Ca, a rare earth element, and misch metal in a collective amount not exceeding about 1 weight %, and Bi in an amount not exceeding about 10 weight %.

208. The soldering process of claim 198, wherein the Pb-free solder further includes at least one additional alloy component selected from the group consisting essentially of Si, Sb, Zn, Mg, Ca, a rare earth element, and misch metal in a collective amount not exceeding about 1 weight %.

209. The soldering process of claim 198, wherein the Pb-free solder further includes an additional alloy component in an amount effective to lower the solder melting temperature range.

210. The soldering process of claim 209, wherein the Pb-free solder includes Bi in an amount not exceeding about 10 weight %.

211. A Pb-free joint comprising of:
a ternary eutectic composition of about 3.6 to about 4.7 weight % Ag, about 0.9 to about 1.7 weight % Cu, and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature,
the Pb-free solder having Sn in an amount to promote formation of intermetallic compounds that improve solder strength and fatigue resistance,
wherein the Pb-free solder is solidified on an electrical wiring board.

212. The Pb-free solder of claim 211, wherein the solder is incorporated into an electronic solder paste of a circuit assembly.

213. The Pb-free solder of claim 212, wherein the circuit assembly is surface mounted with electronic solder paste.

214. The Pb-free solder of claim 211, wherein the solder comprises solder powder particles having a generally spherical shape and a powder particle diameter of less than 25 microns.

215. The Pb-free solder of claim 214, wherein the solder powder particles are incorporated into an electronic solder paste of a circuit assembly.

216. The Pb-free solder of claim 215, wherein the circuit assembly is surface mounted with the electronic solder paste.

217. The Pb-free solder of claim 211, wherein the solder comprises about 3.6 weight % Ag.

218. The Pb-free solder of claim 211, wherein the solder comprises about 4.1 weight % Ag.

219. The Pb-free solder of claim 211, wherein the solder comprises about 4.7 weight % Ag.

220. The Pb-free solder of claim 211, wherein the solder comprises about 93.6 to about 95.0 weight % Sn.

221. The Pb-free solder of claim 211, wherein the intermetallic compounds include at least two intermetallic compounds dispersed in a beta Sn matrix wherein one intermetallic compound includes Cu and Sn and another intermetallic compound includes Ag and Sn.

222. The Pb-free solder of claim 221, wherein the intermetallic compound including Ag and Sn comprises $Ag_3Sn$.

223. The Pb-free solder of claim 221, wherein the intermetallic compound including Cu and Sn comprises $Cu_6Sn_5$.

224. A solder joint comprising:
a Pb-free solder solidified on an electrical wiring board in contact with an electrical conductor, and
the Pb-free solder consisting of a ternary eutectic composition of about 3.6 to about 4.7 weight % Ag, about 0.9 to about 1.7 weight % Cu, and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature,
the Pb-free solder having Sn in an amount to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn.

225. The solder joint of claim 224, wherein the Pb-free solder is solidified to a circuit assembly.

226. The solder joint of claim 225, wherein the circuit assembly is surface mounted with the Pb-free solder.

227. The solder joint of claim 224, wherein the Pb-free solder comprises about 3.6 weight % Ag.

228. The solder joint of claim 224, wherein the Pb-free solder comprises about 4.1 weight % Ag.

229. The solder joint of claim 224, wherein the Pb-free solder comprises about 4.7 weight % Ag.

230. The solder joint of claim 224, wherein the Pb-free solder comprises about 93.6 to about 95.0 weight % Sn.

231. The solder joint of claim 224, wherein the intermetallic compound including Ag and Sn comprises $Ag_3Sn$.

232. The solder joint of claim 224, wherein the intermetallic compound including Cu and Sn comprises $Cu_6Sn_5$.

233. In a soldering process involving solidifying a molten solder, the improvement comprising:
Solidifying a Pb-free solder on an electrical wiring board, the Pb-free solder consisting of a ternary eutectic composition of about 3.6 to about 4.7 weight % Ag, about 0.9 to about 1.7 weight % Cu and the balance Sn having a eutectic melting temperature of about 217° C. and variants of said ternary eutectic composition wherein the relative concentrations of Sn, Ag, and Cu deviate from said ternary eutectic composition to provide a controlled liquid plus solid temperature range with a liquidus temperature not exceeding 15° C. above said eutectic melting temperature,
the Pb-free solder having Sn in an amount to promote formation of intermetallic compounds that improve solder strength and fatigue resistance, said solidified solder having a microstructure comprising a beta Sn matrix and at least two intermetallic compounds dispersed in the matrix wherein one intermetallic compound includes Cu and Sn and another intermetallic compound includes Ag and Sn.

234. The soldering process of claim 233, wherein the Pb-free solder is solidified to a circuit assembly.

235. The soldering process of claim 234, wherein the circuit assembly is surface mounted with the Pb-free solder.

236. The soldering process of claim 233, wherein the Pb-free solder comprises about 3.6 weight % Ag.

237. The soldering process of claim 233, wherein the Pb-free solder comprises about 4.1 weight % Ag.

238. The soldering process of claim 233, wherein the Pb-free solder comprises about 4.7 weight % Ag.

239. The soldering process of claim 233, wherein the Pb-free solder comprises about 93.6 to about 95.0 weight % Sn.

240. The soldering process of claim 233, wherein the intermetallic compound including Ag and Sn comprises $Ag_3Sn$.

241. The soldering process of claim 233, wherein the intermetallic compound including Cu and Sn comprises $Cu_6Sn_5$.

* * * * *